UNITED STATES PATENT OFFICE.

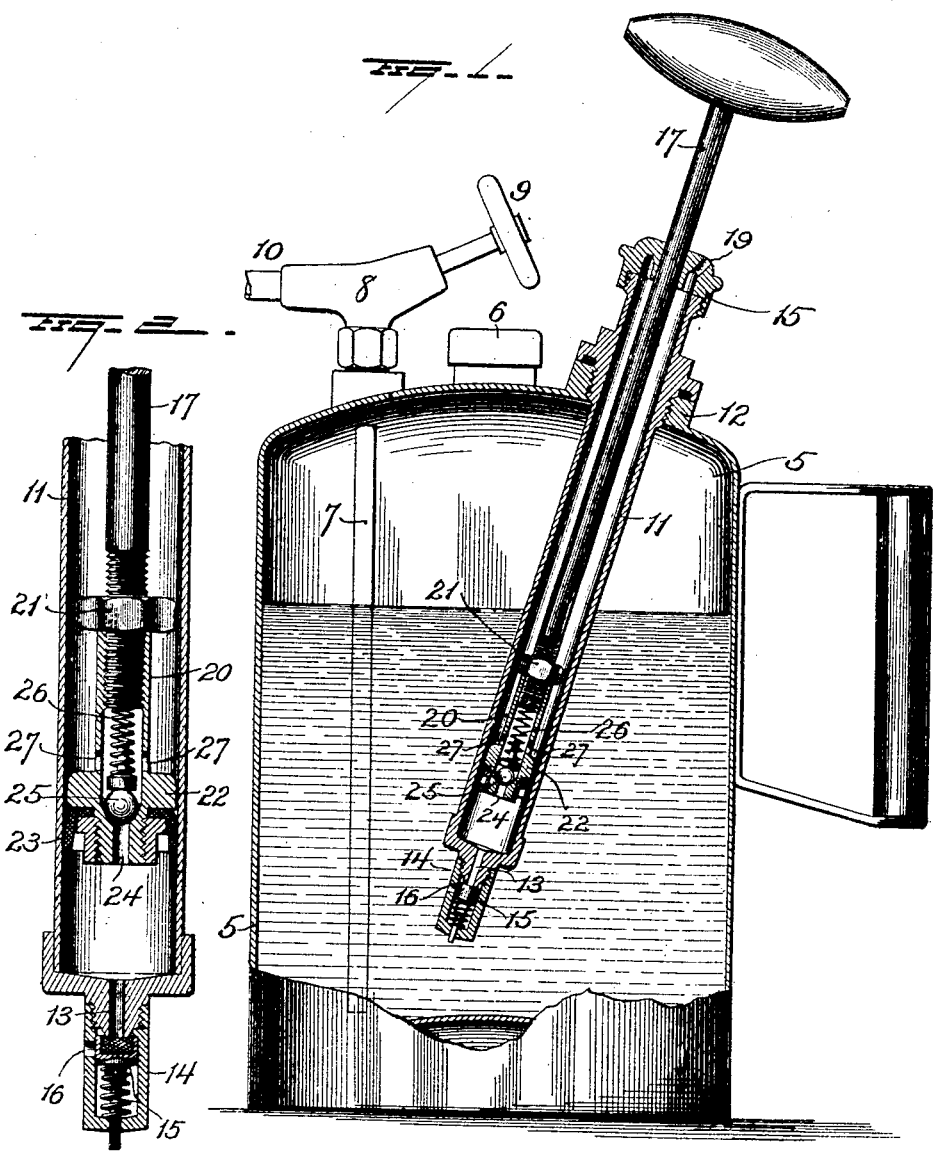

RICHARD WRIGHT, OF PHILADELPHIA, PENNSYLVANIA.

AIR-PUMP.

1,396,494.  Specification of Letters Patent.  Patented Nov. 8, 1921.

Application filed April 5, 1920. Serial No. 371,413.

*To all whom it may concern:*

Be it known that I, RICHARD WRIGHT, a citizen of the United States, and a resident of Philadelphia, in the county of Philadelphia and State of Pennsylvania, have invented certain new and useful Improvements in Air-Pumps; and I do hereby declare the following to be a full, clear, and exact description of the invention, such as will enable others skilled in the art to which it appertains to make and use the same.

My invention relates to improvements in air pumps for use in connection with tanks for kerosene and other oil burning torches and heaters, for inflating automobile tires etc., the object being to provide means for limiting the air-pressure within the tank or tire and it consists in the parts and combination of parts and in the details of construction as will be more fully described and pointed out in the claims.

In the accompanying drawings; Figure 1 is a view in section of a tank with my improved pump therein and Fig. 2 is an enlarged view of the lower end of the pump.

The invention was designed primarily for use on oil torches or heaters in which the oil is forced out of the tank by air pressure within the tank, the object being to provide means whereby the pump cannot produce a pressure in excess of that for which it is set and while I have shown it in connection with an oil tank, I do not limit its application to such use.

5 represents a portable tank having a filling opening closed by a screw cap 6, and 7 is a burner tube for supplying oil to a burner or heater. This tube 7 extends from a point adjacent the lower end of the tank to the coupling 8 screwed to the top of the tank and carrying the hand valve 9 for shutting off and regulating the feed of oil from the tank to the burner 10. The part 10 instead of being a burner may be a pipe leading to a burner or heater.

The oil is forced out through the pipes 7 and 10 by air pressure supplied by a hand pump, the cylinder 11 of which is screwed into the female threaded boss 12 on the top of the tank. The cylinder 11 of the pump is provided at its lower end with a reduced extension 13 terminating at its lower end in a valve seat, and provided with a port for the passage of air.

14 is a thimble shaped valve housing detachably secured to the reduced extension 13 of the cylinder, in which is mounted the spring pressed valve 15 adapted to normally close the port through extension 13 and prevent the passage of oil or back flow of air into the pump cylinder, the housing being provided with an opening 16 in its side for the escape of air from the pump cylinder into the tank. The pump piston rod 17 is mounted to move in the head 18 of the cylinder, and the said head is provided with one or more holes 19 for the free passage of air into and out of the cylinder.

The piston rod is threaded at its lower end for the adjustable attachment of the sleeve 20, and may be locked in place after it has been adjusted on the rod by the lock nut 21.

The piston 22 is provided with the leather or other flexible cup-shaped packing 23, which contracts during the upward stroke of the piston to permit the air to pass around and below the piston, and which is expanded by the air pressure beneath same during the downward stroke of the piston and operates to force the air past valve 15 and into the tank. The piston 22 is provided with a centrally located air port normally closed by the ball valve 25 which is yieldingly held seated by the spring 26, the upper end of which bears against the lower end of piston rod 17. The piston is counter-bored above port 24 to form a seat for the upwardly opening valve 25, and this counterbore is in open communication with the sleeve 20 of the piston, which sleeve is provided with one or more openings 27 for the passage of air into the cylinder.

The valve 25 may be adjusted for any ordinary pressure, either by changing the spring or increasing or decreasing the tension of the spring. If but little pressure be required or desired in the tank, the spring may be a light one, and it can be adjusted within certain limits to increase the pressure, by adjusting the sleeve on the piston rod. If a greater pressure be required a heavier spring may be used and this can also be adjusted to increase the pressure by the adjustment of the sleeve on the piston rod.

Hence it will be seen that with the ball valve 25 held to its seat by a spring that will sustain a certain pressure, the valve will remain seated until such pressure has been attained and any increase of pressure will cause the valve to rise and permit the excess to escape.

In the operation of the apparatus, the pressure within the cylinder 11 below the piston when the latter is at the end of its down stroke, will be the same as the pressure of air within the tank 5, and if the spring is set for say forty pounds pressure in the tank, the valve 25 will remain seated until the pressure has been reached and after it has been reached, the valve 25 will open at each down stroke of the plunger and let the excess of air escape, thus absolutely preventing the accumulation of a pressure in the tank greater than that for which the valve has been set. During the down stroke of the plunger the air within the cylinder below the plunger is under pressure and if that pressure be less than that for which the valve 25 is set, the air will be forced past valve 15 and through port 16 into the tank. The instant the piston begins its up stroke valve 15 closes and prevents the oil or air as the case may be from entering the pump cylinder, thus creating a partial vacuum under the piston into which air is drawn through the cap of the cylinder by the up stroke of the piston. By now forcing the piston down the air will be forced into the cylinder, until as previously stated, the pressure in the latter reaches the limit at which valve 25 has been set and the continued operation of the pump after such limit has been reached, simply opens valve 25 and permits the excess to pass out through the openings 27 into the valve cylinder. The valve 25 should be seated under a pressure that will allow an ample margin of safety and when so set, it is absolutely impossible to create within the cylinder a greater pressure than that at which the valve is set.

Where gages are used to indicate the pressure, they are liable to become choked or otherwise rendered inoperative and when this occurs the operator has no way of ascertaining when the necessary pressure has been reached. With my improvement it is impossible to create a pressure within the tank greater than that for which the valve 25 is set, hence if the latter be set for a pressure within the safety margin, all danger of explosion from excessive pressure is positively overcome.

With my improvement the valve 15 at the lower end of the pump cylinder is held closed by the spring and also by the pressure within the tank and this pressure must be overcome by the piston before any air can be forced past valve 15, hence with valve 15 held to its seat by the pressure within the tank and the valve 25 arranged to open under a predetermined pressure, it will be readily seen that when the pressure at which valve 25 has been set to resist has been reached, no additional air can be forced into the cylinder hence under the down stroke of the piston the air will be forced past valve 25 and up and out through the hole 19 in the cap of the cylinder and thus indicate to the operator that the necessary pressure has been reached.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. In a pump, the combination of a cylinder having a free opening at its upper end and an outlet at its lower end, a valve normally closing said outlet and opened by pressure below the piston, a piston, a by-pass port through the piston and discharging into the cylinder above the piston, an upwardly opening valve in said by-pass port, a spring for yieldingly holding said valve on its seat and means for adjusting the tension of said spring.

2. In a pump, the combination of a cylinder having an outlet, a valve normally closing the latter, a piston having a by-pass through the same, the said by-pass leading from the lower end of the piston and communicating with the cylinder above the piston, a downwardly closing valve for normally closing said by-pass, a spring for holding said valve on its seat and means carried by the piston rod for adjusting the tension of the spring.

3. In a pump, the combination of a cylinder having an outlet, a valve normally closing said outlet, a piston having a by-pass, a sleeve on the piston, the said sleeve having air escape opening therein, a valve for normally closing the by-pass, a spring within the sleeve and bearing against the valve and a piston rod adjustably secured to the sleeve and bearing against the end of the spring whereby the tension on the latter may be regulated.

4. In a pump, the combination of a cylinder having an outlet, a valve normally closing said outlet, a piston having a by-pass through same, a sleeve on the piston and provided with an air outlet opening, a valve for normally closing the by-pass in the piston, a spring within the sleeve and bearing on the valve, a piston rod adjustably secured to the sleeve and bearing against the spring and a nut for locking the piston rod to the sleeve.

In testimony whereof I have signed this specification in the presence of two subscribing witnesses.

RICHARD WRIGHT.

Witnesses:
 L. B. A. KELLY,
 JOSEPH F. MUNAZ.